April 2, 1957 — W. J. SCHUPNER — 2,787,047
PORTABLE BROACHES
Filed Oct. 21, 1953 — 2 Sheets-Sheet 1
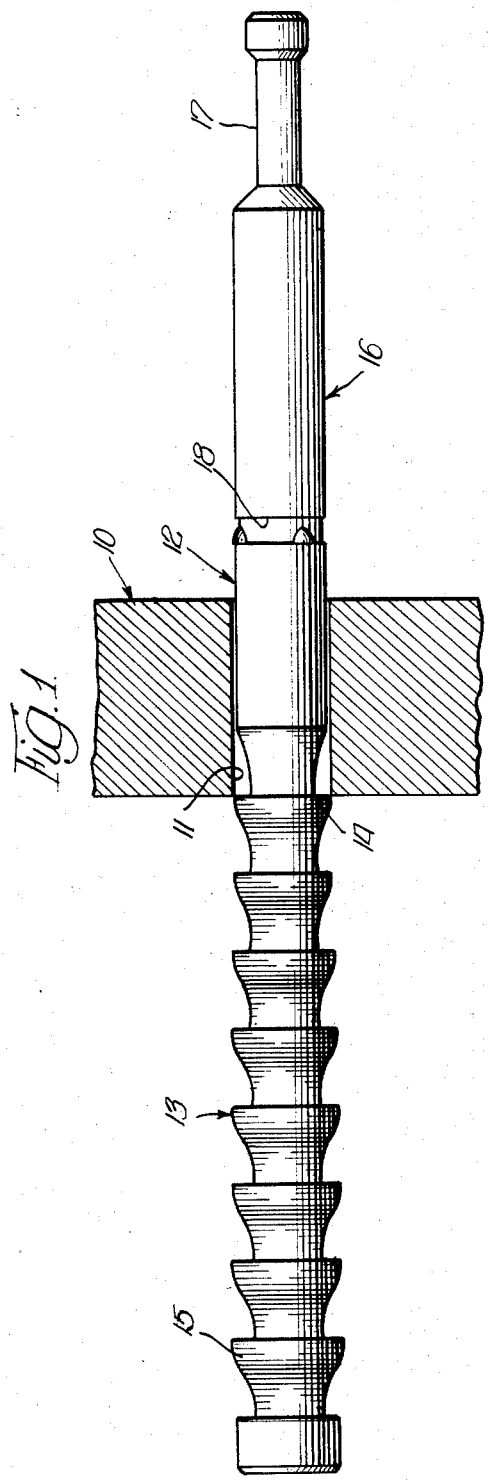
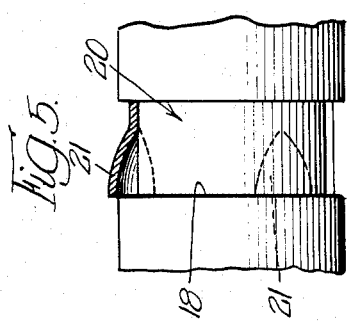
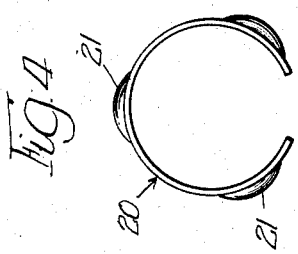
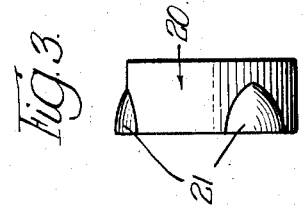
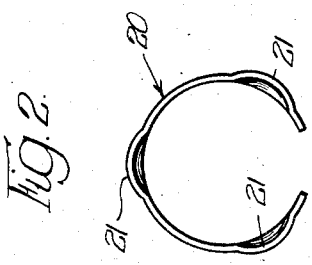
INVENTOR.
Willard J. Schupner
BY
Wilkinson Huxley Byron & Hume
Attys.

April 2, 1957  W. J. SCHUPNER  2,787,047
PORTABLE BROACHES
Filed Oct. 21, 1953  2 Sheets-Sheet 2
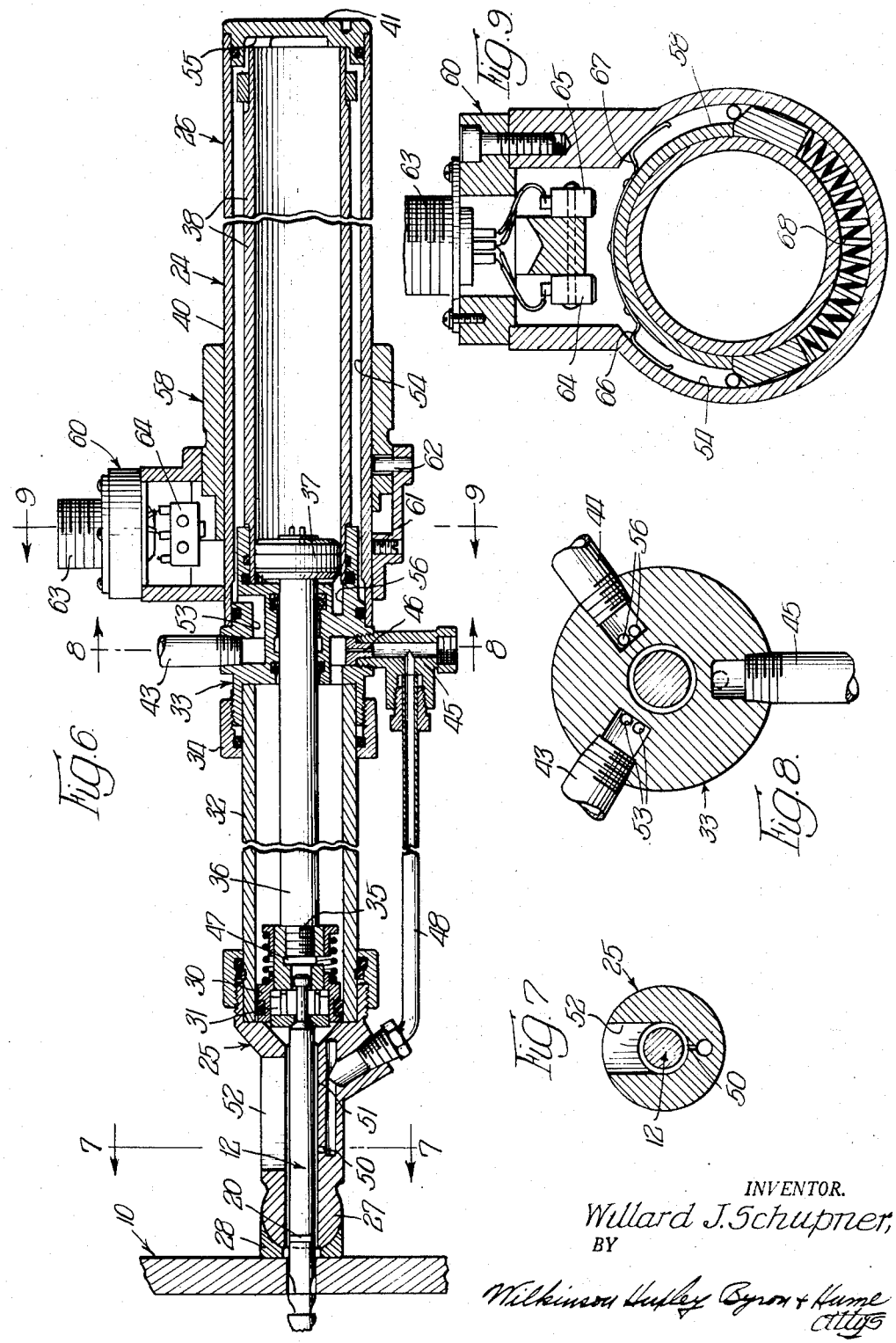
INVENTOR.
Willard J. Schupner,
BY ably ready for use. The broach 12 consists of a broaching portion 13 provided with a plurality of roughing, finishing and burnishing teeth such as 14 and 15, the tooth 14 having the smallest diameter and the tooth 15 having the largest diameter. The cutting teeth from 14 to 15 progressively increase in diameter whereby as the teeth are drawn through the hole 11 the same is broached in the conventional manner to the desired completed size. The opposite end of the broach is formed by the shank portion 16 and said portion terminates in a formation providing the pulling end 17.

United States Patent Office 2,787,047
Patented Apr. 2, 1957

2,787,047

PORTABLE BROACHES

Willard J. Schupner, Evanston, Ill., assignor to Hanna Engineering Works, Chicago, Ill., a corporation of Illinois Application October 21, 1953, Serial No. 387,392

5 Claims. (Cl. 29—95.1)

The invention relates to the art of broaching small holes and has reference more particularly to an improved broaching tool whereby to facilitate the engagement of a portable broach pulling machine with the pulling or shank end of the broaching tool.

In order to broach a hole in a metal plate, for example, the said hole must first be drilled to a diameter several thousandths of an inch less than the finished diameter. The drilled diameter of the hole is just slightly larger in size than that of the pulling end of the broach to be inserted in the hole for a distance which permits the first roughing tooth to contact the metal plate. The pull end of the broach thus projects beyond the opposite side of the plate a distance equal to the shank length less the thickness of the plate. The operator then engages the head of a portable broach pulling machine with the said shank end or pulling end of the broach and to accomplish this a certain amount of thrust is required to overcome the friction of the locking tumblers of the head. Therefore, unless some means is provided to prevent it, the broach may be pushed from the hole, preventing proper engagement of the pulling head.

Accordingly, an object of the invention is to provide an improved broach having an annular member located in a groove in the pulling end of the broach and which is constructed and arranged to permit the pulling end to be inserted through the hole but which will prevent retraction of the broach.

Another object of the invention is to provide a broach having a split ring location in an annular groove in the broach and constructed with a plurality of projections which move inwardly upon contacting the walls of the hole, due to the resilience of the split ring, to permit the pulling end of the broach to be inserted through the hole, and which projections will spring back to their normal position after passing through the hole to prevent removal of said broach from the same side of the hole from which it was originally inserted.

A further object resides in the provision of a broach as described which will have an annular groove formed in its pulling end for receiving a split resilient ring constructed and arranged to form a stop for the broach to prevent its retraction out of the hole, whereby the head of the broach pulling machine can be quickly and conveniently associated with said broach for performing a broaching operation on said hole.

With these and various other objects in view, the invention may consist of certain novel features of construction and operation as will be more fully described and particularly pointed out in the specification, drawings and claims appended thereto.

In the drawings which illustrate an embodiment of the invention and wherein like reference characters are used to designate like parts—

Figure 1 is a sectional view of a metal plate having a hole therein, with the broach of the invention in operative position for broaching said hole;

Figure 2 is an enlarged left end elevational view of the split ring as shown on the broach of Figure 1, and which ring has protuberances or projections formed thereon for the purpose described;

Figure 3 is a side elevational view of the split ring of Figure 2;

Figure 4 is a right end elevational view of the split ring as shown in Figures 2 and 3;

Figure 5 is a sectional view taken transversely of the ring and showing the same on an enlarged scale as located in the groove formed therefor in the pulling end of the broach;

Figure 6 is a longitudinal sectional view of a broach pulling machine, showing the head of the same in connected relation with the pulling end of a broach embodying the improvement of the invention;

Figure 7 is a sectional view taken substantially along line 7—7 of Figure 6;

Figure 8 is a sectional view taken substantially along line 8—8 of Figure 6; and Figure 9 is a sectional view taken substantially along line 9—9 of Figure 6.

Referring to the drawings, particularly Figure 1, the metal piece 10 has a hole therethrough on which a broaching operation is to be performed, and, accordingly, the hole 11 has been drilled several thousandths of an inch smaller than the desired finished diameter of the opening. A broaching tool 12 has been inserted in the hole from the left side thereof and, as shown, the broach is operatively positioned and ready for use. The broach 12 consists of a broaching portion 13 provided with a plurality of roughing, finishing and burnishing teeth such as 14 and 15, the tooth 14 having the smallest diameter and the tooth 15 having the largest diameter. The cutting teeth from 14 to 15 progressively increase in diameter whereby as the teeth are drawn through the hole 11 the same is broached in the conventional manner to the desired completed size. The opposite end of the broach is formed by the shank portion 16 and said portion terminates in a formation providing the pulling end 17.

In accordance with the invention the shank end 16 is formed with an annular groove 18 located intermediate its ends and which receives the split ring 20 formed of resilient material. The resilient ring 20 hugs the base of the annular groove 18 and as a result the ring is located below the outside circumference of the shank portion 16 with the exception of the bulges or protuberances 21 formed in the ring. The said bulges or projections are located on the left edge of the ring and the same are arcuate in formation, being spaced angularly around the ring approximately 120 degrees apart. It will be understood that the bulges formed in the ring project above the outside circumference of the shank portion although it is possible to collapse the same due to the resilience of the ring and thus depress the bulges below the circumference of said shank portion.

The bulges are formed by deforming the metal of the ring radially outwardly and, since the bulges project their maximum distance at the left edge of the ring, stop elements are formed for purposes to be presently described. Figures 2 and 4 illustrate the arcuate shape of the bulges in front and rear elevations, respectively, whereas, Figure 5 illustrates their arcuate shape in a direction axially of the ring and as a result of this latter configuration each bulging section presents a tapering exterior surface.

From the foregoing, it will be evident that when the broach is inserted through the hole 11 from the left side of the metal plate 10 the bulges or projections 21 of the ring 20 will collapse inwardly. This collapsing of the bulging sections is due to their contact with the wall of the hole and to the exterior taper of the bulging sections which is such as to allow movement of the broach toward the right. Eventually the ring is located on the right hand side of the metal plate 10 as shown in Figure 1. The bulging sections immediately spring back to original position after passing through the opening and thus they form a positive stop since the edge of each bulging section will contact the right hand face of the metal plate 10, preventing retraction of the broach. Accordingly, it is possible with the improved broach of the invention to quickly and easily associate therewith the head of a broach pulling machine, which requires that a certain amount of thrust be applied to the broach in a left hand direction. The application of said thrust to the shank end of the broach would push the broach out of the hole and prevent proper engagement of the pulling head therewith were it not for the stopping action of the ring 20. The ring may be fabricated from any material such as brass, spring steel or the like, and although a split ring is shown, the invention is not specifically limited thereto since it is only necessary that the bulging sections have ability to collapse inwardly to permit insertion of the broach and that they spring back to their initial position when released to provide the stopping action as herein explained.

Figure 6 discloses a conventional broach pulling machine such as may be associated with the pulling end 17 of the broach 12. Such a machine is simple to operate and relatively light in weight since it is constructed for the most part of high strength aluminum with alloy steel being used for those members which are subjected to excessive stresses. The numeral 24 indicates the broach pulling machine in its entirety, the same including the pulling end 25 located at the left hand end of the machine, and the hydraulically powered section 26 located at the right hand end of the machine. The pulling end 25 terminates in a ball and socket arrangement which includes the ball-shaped member 27 and the seating member 28, the latter member being adapted to contact the metal plate 10 to thereby permit the ball and socket arrangement to compensate for slight inaccuracies when the pulling machine proper is lined up with the broach for effecting a broaching operation. Numeral 30 indicates the actual pulling member or head of the broach pulling machine, the same carrying a plurality of tumblers 31 which are adapted to engage the pulling end 17 of the broach so as to securely connect the broach with said pulling head 30. The head is circular in shape, being mounted for reciprocating movement within the cylinder 32, which cylinder extends forwardly of the base portion 33 of the machine, being releasably held thereto by means of the threaded sleeve 34. Head 30 is threadedly secured as at 35 to the piston rod 36, which extends axially of cylinder 32, and projects through base portion 33 of the machine. A piston 37 is secured to the right hand projecting end of the piston rod 36 and said piston is mounted for reciprocating movement within cylinder 38 which is concentrically positioned within and housed by the outer cylinder 40 of the hydraulically powered section of the machine. The cylinder 40 is fixedly united to base portion 33 at its left hand end and said cylinder has its right hand end closed by the end member 41.

Since the broach pulling machine is hydraulically operated the base portion 33 is provided with conduits 43 and 44 which provide an inlet and an outlet for the hydraulic fluid, the conduits alternating as an inlet and outlet as the piston 37 is caused to reciprocate within cylinder 38. A third conduit 45 is provided, having threaded connection with base portion 33 and which connects with a supply of air under pressure for delivering the same to the pulling head end of the machine to maintain said end clean and free of metal chips such as are produced during the broaching operation. The passage 46 within conduit 45 admits air to the interior of cylinder 32 from which it enters passage 47 in the pulling head 30. An air blast is accordingly delivered to the pulling end 17 of the broach to maintain said end and the tumblers 31 free and clean of metal chips. A portion of the compressed air supplied to conduit 45 is diverted by the pipe 48 and delivered to the pulling end 25 of the machine. The passages 50 and 51 accordingly supply an air blast to the broach during the broaching operation so that the metal chips removed from plate 10 in broaching the hole will be discharged through the slot 52 provided for the purpose.

Referring again to the conduit 43, it will be seen that the passage 53 formed in the base portion 33 communicates at one end thereof with the said conduit 43 and at their opposite end with the space 54 between the cylinders 38 and 40. Fluid such as oil under pressure admitted by conduit 43 to the passages 53 will thus flow through the annular space 54 and into the interior of cylinder 38, said oil being admitted thereto as a result of the passage 55 provided by the member 41. The oil thus admitted to this end of cylinder 38 will drive the piston 37 in a direction to the left and eventually the piston will be located at its extreme left hand end as shown in Figure 6. As a result the pulling head 30 is thus located at its extreme left hand end and due to the contact which head 30 has with section 25 of the machine the tumblers 31 are caused to open. This automatic opening action of the tumblers permits convenient association of said tumblers with the pulling end of the broach. For a broaching operation the piston 37 must be reciprocated in a right hand direction. This requires that oil under pressure be admitted to conduit 44, which supplies said oil through passages 56 to the left hand end of cylinder 38. As previously explained, the oil conduits 43 and 44 have alternate operation as an inlet and an outlet. Accordingly, when oil is admitted by conduit 43 to drive piston 37 to the left end of cylinder 38, it will be understood that conduit 44 functions as an outlet, allowing the oil in front of the piston to escape. In a similar manner when oil is admitted by conduit 44 to drive the piston to the right, said conduit 43 functions as an outlet, permitting the oil in front of the piston to escape.

For controlling flow of hydraulic fluid to the oil conduits 43 and 44, respectively, and for additionally controlling the supply of compressed air to conduit 45, the broach pulling machine is provided with a control grip 58 in the form of a sleeve mounted for rotation on cylinder 40 and associated with the electrical housing 60. The housing 60 is fixedly secured to cylinder 40 as by means of one or more set screws 61, and a guide pin 62 is provided thereby for guiding the rotary movement of the control grip 58. The electrical conductors to housing 60 extend through conduit 63, the same having electrical connection with a pair of terminals 64 and 65 located within housing 60 and suitably supported from a wall thereof. The terminals 64 and 65 connect with electrical mechanism, not shown, which in turn controls the supply of hydraulic fluid to and from the oil conduits 43 and 44. The electrical circuits, which include the terminals 64 and 65, can be alternately closed and opened by rotation of the control grip 58 which has the metal contacts 66 and 67 fixedly secured thereto. By means of the coil spring 68 the control grip is maintained in a neutral position with the contacts 66 and 67 being suitably spaced from their respective terminals 64 and 65.

When the hole has been broached the operator turns the control grip in a direction to cause contact 66 to engage terminal 64. As a result fluid under pressure is supplied to conduit 43 and thus to the right hand end of cylinder 38 to force the piston 37 and pulling head 30 in a direction toward the left whereby to effect opening of the tumblers 31. The pulling head can then be released from one broach and associated with the pulling end of another broach, which action will effect some movement of the broach in a retracting direction. However, the ring 20 will eventually engage the plate 10 to prevent additional retracting movement. This allows the operator to quickly and easily associate the pulling head with the broach and after the broach pulling machine is properly lined up the operator turns the control handle in a direction to cause contact 67 to engage terminal 65. The fluid under pressure is now delivered through conduit 44 to the left hand side of piston 37, effecting movement of the same in a direction toward the right. As the pulling head 30 moves away from the pulling end 25 the tumblers 31 automatically close on the pulling end 17 of the broach and continued movement of the parts will pull the broach through the hole. Simultaneously with this operation air is supplied to conduit 45 so that an air blast issues from passages 47, 50 and 51. In fact, the air blast is operative each time the piston 37 and head 30 are reciprocated.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a broaching tool of the type having a plurality of cutting teeth at one end and having a shank portion at the opposite end, said shank portion having a circumferential groove formed therein approximately mid-way of its length, a resilient member positioned in the groove and providing a plurality of bulging sections angularly spaced around the groove, said sections having an exterior contour which is arcuate and said sections normally extending outwardly beyond the circumference of the shank portion, and said bulging sections being formed along one edge only of the ring member, whereby said sections provide a stop preventing passage of the broaching tool in a certain direction through an opening the diameter of which is less than that encompassed by the bulging sections when normally extended.

2. In a broaching tool of the type having a plurality of cutting teeth at one end and having a shank portion at the opposite end, said shank portion having a circumferential groove formed therein, a split ring member positioned in the groove and retained therein by the resiliency of said member, a plurality of bulging sections provided by the ring member and being angularly spaced around the member, said sections normally extending outwardly beyond the circumference of the shank portion, and said bulging sections having location along one edge of the ring member, whereby said sections provide a stop preventing passage of the broaching tool in a certain direction through an opening the diameter of which is less than that encompassed by the bulging sections when normally extended.

3. A broaching tool for broaching a hole in a metal plate, said tool including a shank portion having a circumferential groove formed therein, a ring member of resilient material positioned in the groove, a plurality of arcuate shaped protuberances formed in the material of said ring member and normally projecting outwardly beyond the circumference of the shank portion, said protuberances contracting due to the resilience of the ring member to permit insertion of the shank portion through said hole in a certain direction, and said protuberances providing a stop when fully extended to prevent retraction of the shank portion from said hole.

4. A broaching tool for broaching a hole in a metal plate, said tool including roughing teeth and a shank portion having a pulling end, a circumferential groove formed in the shank portion, a ring member of resilient material positioned in the groove, a plurality of arcuate shaped protuberances formed in the material of the ring member, said protuberances being angularly spaced around the ring and normally projecting outwardly beyond the circumference of the shank portion, said protuberances contracting due to the resilience of the ring member to permit insertion of the shank portion through said hole to cause the roughing teeth to engage the metal plate, and said protuberances being formed in one edge only of the ring member to provide a stop when fully extended to prevent retraction of the shank portion from said hole.

5. A broaching tool for broaching a hole in a metal plate, said tool including a section providing roughing teeth and a section forming a shank having a pulling end formed thereon, a circumferential groove in the shank section approximately mid-way of its length, a split ring member positioned in the groove and retained therein by the resiliency of said member, a plurality of dome-shaped protuberances formed in the material of the ring, said protuberances being angularly spaced around the ring and normally projecting outwardly beyond the circumference of the shank portion, said protuberances contracting inwardly due to the resilience of the ring member to permit insertion of the shank section through said hole to cause the roughing teeth to engage the metal plate, and said protuberances being formed in an edge of the ring member to provide a stop when fully extended to prevent retraction of the shank portion from said hole.

References Cited in the file of this patent

UNITED STATES PATENTS

| 1,328,085 | Hollander | Jan. 13, 1920 |
| 2,334,795 | Smith | Nov. 23, 1943 |